(12) United States Patent
Crnogorac et al.

(10) Patent No.: US 9,316,068 B2
(45) Date of Patent: Apr. 19, 2016

(54) GRIPPER ASSEMBLY FOR A COILED TUBING INJECTOR

(71) Applicants: Drago Crnogorac, Calgary (CA); Allan Joseph Pleskie, Chestermere (CA); Wojciech Niemczewski, Calgary (CA); Matthew Gotch, Calgary (CA)

(72) Inventors: Drago Crnogorac, Calgary (CA); Allan Joseph Pleskie, Chestermere (CA); Wojciech Niemczewski, Calgary (CA); Matthew Gotch, Calgary (CA)

(73) Assignee: Tissa Engineering Inc., Alberta (CA)

( * ) Notice: Subject to any disclaimer, the term of this patent is extended or adjusted under 35 U.S.C. 154(b) by 367 days.

(21) Appl. No.: 13/850,689

(22) Filed: Mar. 26, 2013

(65) Prior Publication Data

US 2014/0290932 A1 Oct. 2, 2014

(51) Int. Cl.
*E21B 19/22* (2006.01)
*B65G 37/00* (2006.01)
*B65G 15/14* (2006.01)

(52) U.S. Cl.
CPC ............... *E21B 19/22* (2013.01); *B65G 15/14* (2013.01); *B65G 37/005* (2013.01)

(58) Field of Classification Search
CPC ........................................................ E21B 19/22
USPC ............................................... 166/77.2, 77.3
See application file for complete search history.

(56) References Cited

U.S. PATENT DOCUMENTS

| | | | | |
|---|---|---|---|---|
| 4,235,295 A | * | 11/1980 | Zyglewyz | 175/371 |
| 5,188,174 A | | 2/1993 | Anderson, Jr. et al. | |
| 6,609,566 B2 | | 8/2003 | Perio, Jr. | |
| 2001/0040031 A1 | * | 11/2001 | Shaaban et al. | 166/77.3 |
| 2010/0132935 A1 | * | 6/2010 | Magnus | 166/77.3 |
| 2011/0048694 A1 | * | 3/2011 | Maschek et al. | 166/77.3 |

FOREIGN PATENT DOCUMENTS

| | | |
|---|---|---|
| CA | 2 236 358 | 11/1998 |
| CA | 2 699 906 | 2/2011 |

* cited by examiner

*Primary Examiner* — Jennifer H Gay
*Assistant Examiner* — George Gray
(74) *Attorney, Agent, or Firm* — McAndrews, Held & Malloy, Ltd.

(57) ABSTRACT

An improved gripper shoe for a coiled tubing injector having a gripper shoe having a plurality of arcuate gripper elements spaced apart at predetermined intervals, a gripper carrier having a base having an upper surface and a lower surface, a first wall and a second wall located on the upper surface of the base, a mechanism for securing the gripper carrier to a continuous chain of a coiled tube injector located on the lower surface of the gripper assembly, and a mechanism for securing the gripper shoe to the gripper carrier, such that the gripper shoe is securely received by, and releasable from, the gripper carrier.

13 Claims, 3 Drawing Sheets

GRIPPER ASSEMBLY FOR A COILED TUBING INJECTOR

FIELD

The present disclosure relates to coiled tubing injection systems for use during the operation and maintenance of oil and gas wells. More specifically, the present disclosure relates to an improved gripper assembly for a coiled tubing injector.

BACKGROUND

It has become commonplace in the oil and gas industry to use coiled tubing in downhole intervention in oil and gas wells. Coiled tubing typically ranges in diameter from 1 to 4.5", and is stored on large spools located near the wellhead.

Coiled tubing serves multiple purposes in the oil and gas industry, such as: fluids can be delivered downhole for various stimulation and maintenance operations (including fluids entrained with particulate proppant), production fluids can be pumped out of the wellbore and recovered for refinement, and wellbore tools (also known as a tool string) can be lowered downhole while suspended from the coiled tubing as coiled tubing is typically manufactured out of high tensile strength materials such as steel. In some applications, these suspended wellbore tools can be hydraulically powered by pressurized fluid provided by the coiled tubing.

Previously, wireline technology was used to lower tools (such as logging instruments, mud drills, perforation apparatuses, etc.) downhole into the wellbore under the force of gravity. Wirelines are typically only suitable for use in perfectly vertical wellbores due to the fact that wirelines are inherently flexible and cannot be "pushed" into a wellbore.

One advantage presented by the use of coiled tubing is that due to the rigid (yet limitedly flexible) nature of the tubing, it can be pushed into the wellbore and therefore can be used in wellbores that deviate from a perfectly vertical alignment. In this way, coiled tubing can be used in directional drilling applications that are wholly unsuited to predecessor wireline technology.

Coiled tubing is "pushed" into or "pulled" from the wellbore by way of a coiled tubing injector. Typical coiled tubing injectors consist of a pair of opposed "endless" (i.e. continuously looped) chainsets that rotate in the same plane. These opposed chainsets each have a number of gripper assemblies which forcibly grip the coiled tubing. Each chain set has a bearing skate which pushes the two chainsets together, thereby squeezing the coiled tubing in the opposed gripper assemblies. In this way, the coiled tubing is "pulled" off the spool and "pushed" into the wellbore by the coiled tube injector.

U.S. Pat. No. 6,609,566 discloses a coiled tubing injector head having multiple endless chains and a plurality of gripper assemblies are positioned around the middle links of the endless chains.

U.S. Pat. No. 5,188,174 discloses a coiled tubing injector having a frame upon which is mounted a pair of opposed endless flexible conveyor members. The conveyor members have opposed elongated parallel runs spaced apart to form a path for engagement with the tubing by gripper blocks disposed on the conveyor members.

CA2236358 discloses a gripping element of a coiled tubing injector that has a carrier and a removable gripping shoe mounted to the carrier. The removable shoe slides onto slots formed on the carrier and is floated on the carrier by inserting an elastomeric pad sandwiched between the carrier and shoe.

CA 2699906 discloses a gripper for use within a coiled tubing injector unit and having a carrier for securing the gripper to the chain drive mechanism of the coiled tubing injector unit and a gripping shoe carried by the carrier.

However, previously known gripper assemblies are often inflexible and can place undue stress on the components of the coiled tubing injector, particularly load supporting bearings. This is exacerbated by the fact that many oil and gas wells are located in extremely hostile environments that increase the maintenance requirements of oilfield production equipment and specifically equipment with moving parts.

Therefore, an improved gripper assembly is needed to reduce maintenance costs and extend operating life of the components of the presently available coiled injectors.

This background information is provided for the purpose of making known information believed by the applicant to be of possible relevance to the present invention. No admission is necessarily intended, nor should be construed, that any of the preceding information constitutes prior art against the present invention.

BRIEF SUMMARY

In at least one embodiment, the present disclosure provides a gripper assembly for a coiled tubing injector having a gripper shoe having a base having a first side a second side, a first end and a second end, a plurality of arcuate gripper elements spaced apart at predetermined intervals between said first end and the second end of the base, each the plurality of arcuate gripper elements extending between the first side and the second side of the base, each of the arcuate gripper elements having a first outwardly facing side, a second outwardly facing side, and an arcuate gripping surface extending between the first outwardly facing side and the second outwardly facing side, a gripper carrier having a base having an upper surface and a lower surface, a first wall and a second wall located on the upper surface of the base, and means for securing the gripper carrier to a continuous chain of a coiled tube injector located on the lower surface of the gripper assembly, and means for securing the gripper shoe to the gripper carrier, wherein the gripper shoe is received between the first wall and the second wall of the gripper carrier.

BRIEF DESCRIPTION OF THE DRAWINGS

The present disclosure will be better understood when read in connection with the following drawings, in which.

DETAILED DESCRIPTION OF THE EMBODIMENTS

Figure 1:
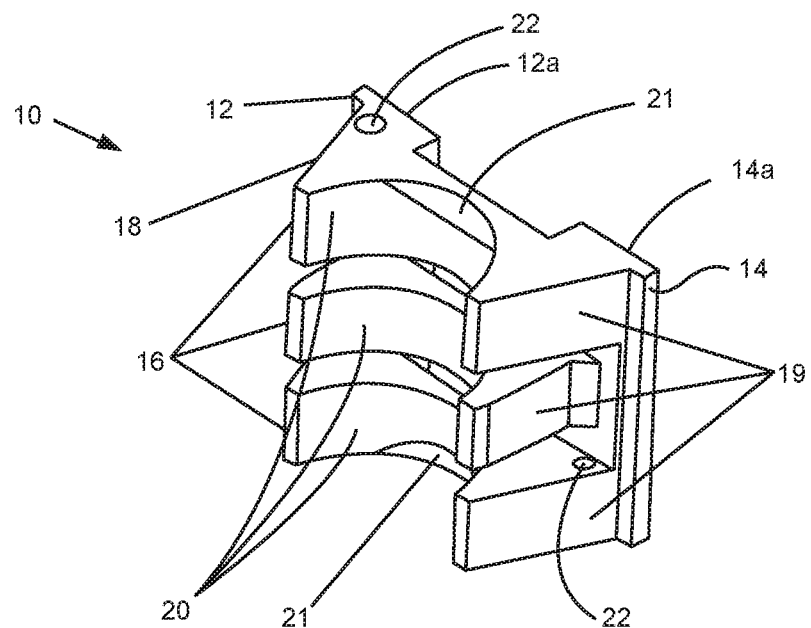
FIG. 1 is an isometric view of a gripper shoe in accordance with at least one embodiment of the present invention.

The present disclosure provides an improved gripper assembly for a coiled tubing injector that can place less wear on the components of the injector, thereby potentially reducing maintenance costs and potentially improving operational life of the equipment.

The present disclosure provides a two-part gripper assembly suitable for use in a conventional coiled tubing injector, the gripper assembly comprises a gripper shoe and a gripper carrier.

In at least one embodiment, the present disclosure provides a gripper assembly for a coiled tubing injector that has a gripper shoe adapted to frictionally yet releasably grip coiled tubing so that the coiled tubing can be injected into and withdrawn from the wellbore. The gripper shoe is received by a gripper carrier that securely mounteable to a continuous chain located on the coiled tubing injector. The gripper carrier and gripper shoe are designed so that the gripper shoe can be quickly and easily changed, for example, due to replacement of worn out parts, or if the size of the coiled tubing is changed.

The present disclosure provides a gripper shoe that is removably but securely received in a gripper carrier to form a gripper assembly. Means for securing the gripper shoe to the gripper carrier are provided, such that it is contemplated that the gripper shoe can be quickly changed while the gripper carrier remains securely fixed to a continuous chain of a coiled tube injector. In this way, the coiled tube injector may be quickly modified to receive different sizes of coiled tubing without requiring significant tools or manpower.

The gripper shoe has a plurality of arcuate gripper elements spaced at predetermined intervals, and are adapted to frictionally yet releasably receive coiled tubing. It is contemplated that the gripper shoe has two or more arcuate gripper elements. Each arcuate gripper element has an arcuate gripping surface which is adapted to frictionally engage with the coiled tubing such that it can securely grab the coiled tubing with a slight frictional interference fit, but will readily release the coiled tubing.

The gripper carrier has an upper surface and a lower surface. The lower surface comprises means for removably yet securely attaching the gripper carrier to the continuous chain of the coiled tubing injector. These attaching means can take a wide variety of forms as are known in the art. The upper surface comprises at least a first and second projecting walls defining therebetween an opening suitably sized to receive the gripper shoe.

In one embodiment, corresponding boreholes are provided in the gripper shoe and the walls of the gripper carrier that align when the gripper shoe is received in the gripper carrier. In this way, a mechanical fastener such as a screw, machine bolt, stud, pin or spring pin, can be inserted through both of these corresponding boreholes in order to removably yet securely fix the gripper assembly relative to the gripper carrier. In some embodiments, it is contemplated that there are two pairs of corresponding boreholes provided on the gripper shoe and the gripper carrier.

Figure 2:
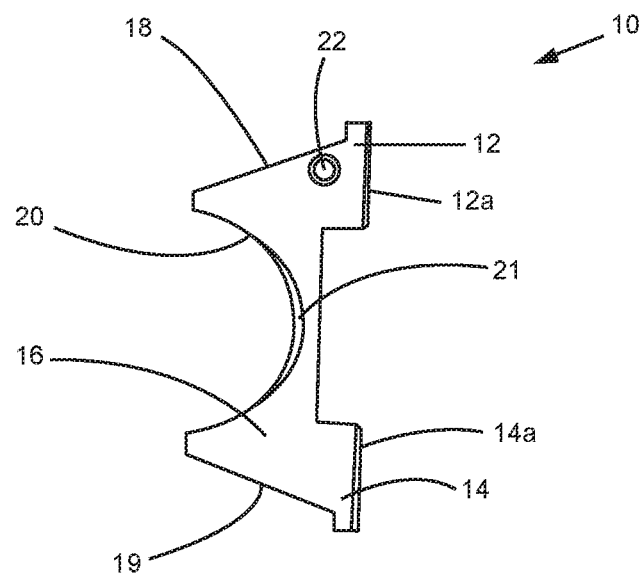
FIG. 2 is a side view of a gripper shoe in accordance with at least one embodiment of the present invention.

Turning to FIGS. 1 and 2, at least one embodiment of a gripper shoe in accordance with the present invention is illustrated. It will be readily appreciated by the skilled person that this embodiment is one of but many ways that one could practice the presently claimed invention without departing from the scope of the present disclosure or the appended claims.

In at least one embodiment, gripper shoe 10 has a base having a first side 12, a second side 14, a first foot portion 12*a* extending along the first side and a second foot portion 14*a* extending along the second side. A plurality of arcuate gripper elements 16 extend between first side 12 and second side 14 of the base. It is contemplated that there are at least two arcuate gripper elements, however three, four or more arcuate gripper elements are also contemplated. In one embodiment, the first and second sides are flanged as shown in FIG. 1. It is also contemplated that the arcuate gripper elements are spaced at predetermined intervals along the gripper shoe.

In at least one embodiment, each arcuate gripper element 16 has a first outwardly facing side 18 and a second outwardly facing side 19. The first and second outwardly facing sides 18 and 19 extend from the base first foot and the base second foot, respectively. It is contemplated that in some embodiments first side 18 and second side 19 are sloped inwardly as shown in FIGS. 1 and 2, however it is also contemplated that first side 18 and second side 19 could be outwardly sloped, perpendicularly oriented, convexly oriented or concavely oriented, among other arrangements that will be readily understood by the skilled person. It is also contemplated that in some embodiments, at least one of first side 18 and second side 19 of arcuate gripper element 16 are shaped to allow access to a borehole, for example as seen in FIG. 1 and as will be discussed in further below.

Each arcuate gripper element 16 has an arcuate gripping surface 20 that extends between the first side 18 and the second side 19. In at least one embodiment, it is contemplated that arcuate gripping surface 20 can have a bevel 21 located on an outside edge of the arcuate gripper elements 16, at a position adjacent the ends of the gripper shoe 10, however it is also contemplated that this bevel will not be present in all embodiments. The bevel provides an approach angle for the tubing, which facilitates gripper shoe 10 receiving coiled tubing in a smooth manner in order to not damage the coiled tubing.

In some embodiments, arcuate gripping surface 20 may be manufactured with a smooth surface as illustrated in FIGS. 1 and 2, however in other embodiments it is contemplated that arcuate gripping surface 20 may be stippled, knurled or otherwise treated to increase the frictional qualities of arcuate gripping surface 20.

In some embodiments, gripper shoe 10 further has at least one borehole 22 that is located on arcuate gripping element 16 adjacent one of first side 12 and second side 14 of the body. It is contemplated that borehole 22 is oriented parallel to both first side 12 and second side 14. Borehole 22 is adapted to receive a mechanical fastener (not shown) as will be discussed in further detail below.

Figure 3:
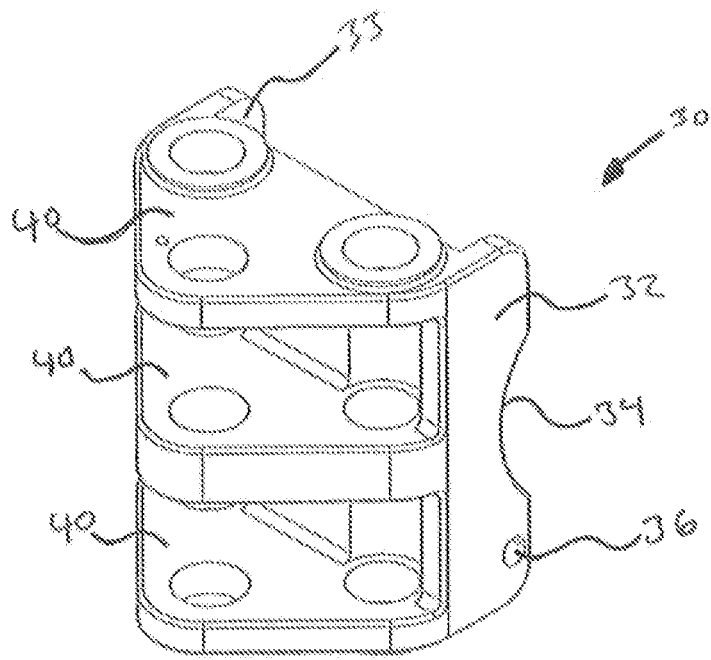
FIG. 3 is an isometric view of a gripper carrier in accordance with at least one embodiment of the present invention.
Figure 4:
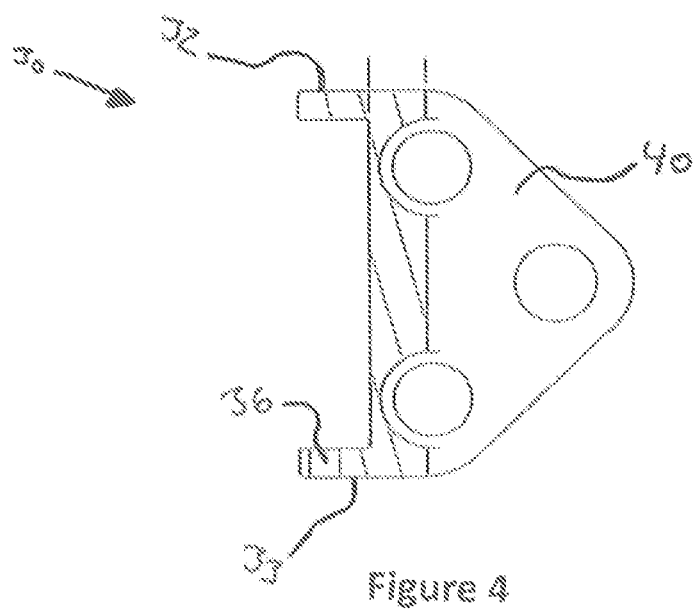
FIG. 4 is an end view of a gripper carrier in accordance with at least one embodiment of the present invention.

Turning to FIGS. 3 and 4, at least one embodiment of a gripper carrier in accordance with the present invention is illustrated. In at least one embodiment, gripper carrier 30 has a rectangular or square shaped base and has a first wall 32 and a second wall 33 that each extend along a side of the gripper carrier 30, and adapted to receive the gripper shoe.

The gripper carrier has an upper surface and a lower surface, wherein the upper surface is adapted to receive the gripper shoe in an opening defined by first wall 32 and second wall 33. In one embodiment, the upper surface has a rectangular shape.

In some embodiments, it is contemplated that first wall 32 and second wall 33 include an arcuate cutout 34 sized and located to accommodate the free passage of the tubing where the walls would otherwise extend into the path of the tubing. It is also contemplated that some embodiments will not include arcuate cutout 34 where the dimensions of the walls permit. It is also contemplated that one or both of first wall 32 and second wall 33 include a borehole 36 that aligns with borehole 22 when gripper shoe 10 is received in gripper carrier 30, as will be discussed in further detail below.

The lower surface of gripper carrier 30 has means for securely yet releasably connecting gripper carrier 30 to a continuous chain on a coiled tubing injector. The configuration of the lower surface is not critical to the current invention, in that the lower surface can have any configuration suitable for joining the gripper carrier to a continuous chain.

Means for securely yet releasably connecting gripper carrier 30 to a continuous chain on a coiled tubing injector can be any suitable known configuration that will be readily understood by the skilled person. In one embodiment, means for connecting gripper carrier 30 to a continuous chain comprises at least one outwardly extending mounting element 40 that extends from the lower surface of the gripper carrier 30.

Figure 5:
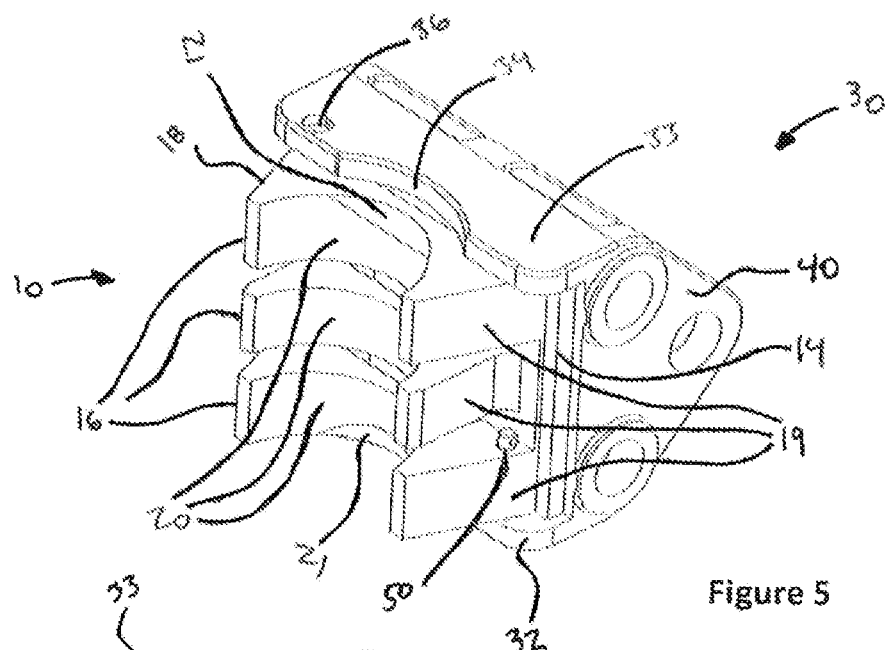
FIG. 5 is an isometric view of a gripper assembly in accordance with at least one embodiment of the present invention.
Figure 6:
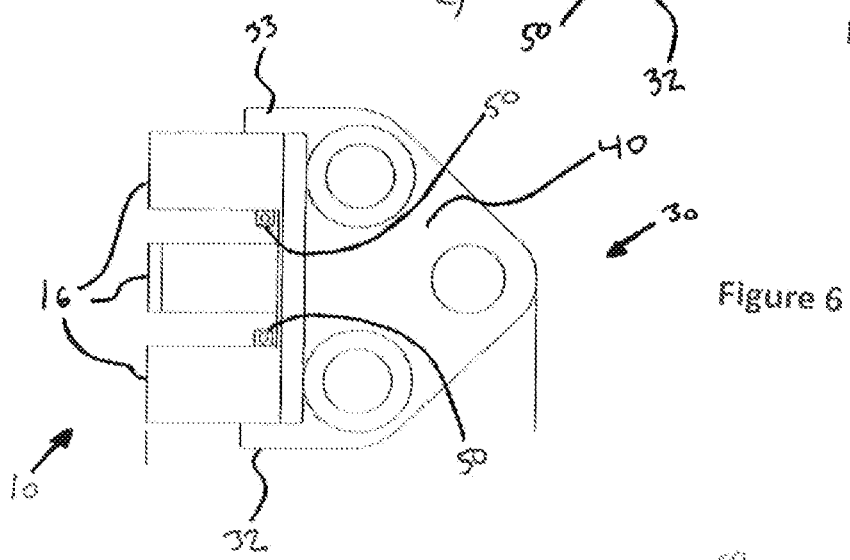
FIG. 6 is an end view of a gripper assembly in accordance with at least one embodiment of the present invention; and, FIG. 7 is a cutaway view of the aligned boreholes and spring pin of a gripper assembly in accordance with at least one embodiment of the invention.
Figure 7:
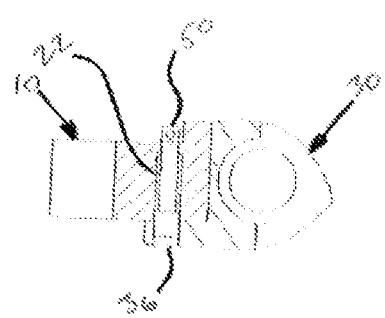

Turning to FIGS. 5, 6 and 7, at least one embodiment of a gripper assembly is illustrated that includes gripper shoe 10 mounted to gripper carrier 30. Gripper shoe 10 is the same as gripper shoe 10 discussed above and further gripper carrier 30 is the same as gripper carrier 30 discussed above. As can be seen in FIGS. 5 and 6, gripper shoe 10 is received in gripper carrier 30 such that the outside surface of arcuate gripping element located at each end of the gripper shoe 10 abut the inside surfaces of walls 32, 33 of gripper carrier 30.

Further and as can be seen in FIG. 7, in some embodiments it is contemplated that a spring pin 50 may be used to retain gripper shoe 10 relative to gripper carrier 30. As will be understood by the skilled person, spring pin 50 is inserted into borehole 22 and compressed such that gripper shoe can be received in gripper carrier 30 as discussed above. When borehole 22 is aligned with borehole 36, spring pin 50 will extend into borehole 36, thereby securely but releasably retaining gripper shoe 10 relative to gripper carrier 30. It is also contemplated that a second pin (as seen in FIG. 6) may be used to secure spring pin 50 relative to gripper shoe 10.

Without wishing to be bound by theory, the spaced apart gripping elements allow for micro elastic deflection of the gripper shoe within the shoe structure itself, thereby overcoming the problems related to uneven loading of adjacent bearings. As such, the present gripper shoe has a series of arcuate gripping elements spaced apart at predetermined intervals in order to allow for local elastic deformation of the tubing which results in improved friction between the shoe and the tubing.

Moreover, spacing between the spaced apart gripping elements also allow for debris to be dispersed, thereby allowing a degree of self-cleaning of the gripper shoe-coiled tubing gripping interface.

Additional benefits of the gripper shoe of the present invention include a means to quickly and easily remove or replace individual shoes—which can consist of two spring loaded pins which interface between the carrier and the shoe. The connection by means of pins in slotted holes allows the gripper shoe to float which provides a self aligning property to prevent damage to the tubing.

All components discussed herein can be formed of any suitable material that will be readily understood by the skilled person, including steel, case hardened steel, chromium-molybdenum steel, among other suitable materials.

It is also contemplated that all components of the device need not necessarily be produced from the same materials, different components may be made from different materials depending on needs and performance requirements of the components such as, but not limited to, strength, weight, etc.

All components discussed herein can be manufactured by any known suitable method including casting, milling and welding, among other suitable manufacturing techniques that will be readily understood by the skilled person. It is contemplated that the gripper shoe and the gripper carrier can each be formed of a single unitary component or separate components suitably connected by mechanical connectors or welding, or other suitable connection methods.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A gripper assembly for a coiled tubing injector, comprising:
   a gripper shoe having:
      a base having a first side, a second side, a first foot, a second foot, a first end and a second end, the first foot extending along the first side, the second foot extending along the second side;
      a plurality of discrete arcuate gripper elements spaced apart at predetermined intervals between said first end and said second end of said base,
      each of said arcuate gripper elements extending between said first side and said second side of said base,
      each of said arcuate gripper elements having a first outwardly facing side, a second outwardly facing side, and an arcuate gripping surface extending between said first outwardly facing side and said second outwardly facing side, the first outwardly facing side extending from the base first foot and the second outwardly facing side extending from the base second foot; and
   a gripper carrier having:
      a base having an upper surface and a lower surface, wherein the upper surface of the gripper carrier is adapted to receive the gripper shoe and said gripper shoe is secured to said gripper carrier by a fastener assembly and wherein said lower surface of said gripper carrier is adapted to be secured to a continuous chain of a coil tube injector.

2. The gripper assembly of claim 1, wherein said gripper carrier has a first wall and a second wall located on said upper surface of said base, wherein said gripper shoe is received between said first wall and said second wall of said gripper carrier.

3. The gripper assembly of claim 2, wherein at least one of said arcuate gripper elements further comprise a bevel on an edge of said arcuate gripping surface of said at least one of said arcuate gripper element.

4. The gripper assembly of claim 2, wherein said first wall and said second wall of said gripper carrier each further comprise an arcuate cutout.

5. The gripper assembly of claim 2, wherein said fastener assembly comprises:
   at least one shoe borehole located on said gripper shoe adjacent to at least one of said first side and said second side of said base of said gripper shoe;
   at least one carrier borehole located on at least one of said first wall and said second wall of said base of said gripper assembly; and,
   a mechanical fastener,
   wherein when said gripper shoe is received in said gripper carrier said at least one shoe borehole aligns with said at least one gripper borehole such that said mechanical fastener may be inserted into said at least one shoe borehole and said at least one gripper borehole such that said gripper shoe is secured relative to said gripper carrier.

6. The gripper assembly of claim 5, wherein said mechanical fastener is a spring pin.

7. The gripper assembly of claim 1, wherein said plurality of arcuate gripper elements is three arcuate gripper elements.

8. The gripper assembly of claim 1, wherein said first outwardly facing side, and said second outwardly facing side are sloped.

9. The gripper assembly of claim 1, wherein said first side and said second side further comprise laterally extending flanges.

10. A gripper shoe for a coiled tubing injector gripper assembly, comprising:
   a base having a first side, a second side, a first foot, a second foot, a first end and a second end, the first foot extending along the first side, the second foot extending along the second side, a plurality of discrete arcuate gripper elements spaced apart at predetermined intervals between said first end and said second end of said base, each of said plurality of arcuate gripper elements extending between said first side and said second side of said base, each of said arcuate gripper elements having a first outwardly facing side, a second outwardly facing side, and an arcuate gripping surface extending between said first outwardly facing side and said second outwardly facing side, the first outwardly facing side extending from the base first foot and the second outwardly facing side extending from the base second foot.

11. The gripper shoe of claim 10 wherein at least one of said arcuate gripper elements further comprise a bevel on an edge of said arcuate gripping surface of said at least one of said arcuate gripper element.

12. The gripper shoe of claim 10, wherein said plurality of arcuate gripper elements is three arcuate gripper elements.

13. The gripper assembly of claim 10, wherein said first outwardly facing side, and said second outwardly facing side are sloped.

* * * * *